(12) United States Patent
Kaku et al.

(10) Patent No.: US 10,576,633 B2
(45) Date of Patent: Mar. 3, 2020

(54) COMMUNICATION DEVICE

(71) Applicant: TOYOTA JIDOSHA KABUSHIKI KAISHA, Toyota-shi, Aichi-ken (JP)

(72) Inventors: Wataru Kaku, Nagoya (JP); Shintaro Yoshizawa, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 210 days.

(21) Appl. No.: 15/710,284

(22) Filed: Sep. 20, 2017

(65) Prior Publication Data

US 2018/0085924 A1 Mar. 29, 2018

(30) Foreign Application Priority Data

Sep. 29, 2016 (JP) .................. 2016-191838

(51) Int. Cl.
*B25J 9/16* (2006.01)
*B25J 11/00* (2006.01)
*G06N 3/00* (2006.01)
*A63H 11/00* (2006.01)
*G05D 11/02* (2006.01)
*G05D 1/02* (2020.01)

(52) U.S. Cl.
CPC ............ *B25J 9/1674* (2013.01); *A63H 11/00* (2013.01); *B25J 9/1697* (2013.01); *B25J 11/0005* (2013.01); *G05D 1/02* (2013.01); *G05D 1/027* (2013.01); *G05D 1/0272* (2013.01); *G06N 3/008* (2013.01); *A63H 2200/00* (2013.01); *G05B 2219/39088* (2013.01); *G05B 2219/39091* (2013.01); *G05B 2219/40411* (2013.01); *G05B 2219/45007* (2013.01); *G05D 2201/0217* (2013.01)

(58) Field of Classification Search
CPC .... B25J 9/1674; B25J 9/1697; B25J 11/0005; B25J 13/089; B25J 13/087; B25J 11/0015; G05D 1/02; G05D 1/027; G05D 2201/0217; G06N 3/008; A63H 2200/00; G05B 2219/39088; G05B 2219/39091; G05B 2219/40411; G05B 2219/45007
USPC ........................................ 700/245, 250, 253
See application file for complete search history.

(56) References Cited

U.S. PATENT DOCUMENTS 9,902,061 B1 * 2/2018 Kuffner .................. H04W 4/80
2002/0198626 A1 12/2002 Imai et al.
(Continued)

FOREIGN PATENT DOCUMENTS

EP 2025478 A1 2/2009
EP 2810748 A1 12/2014
(Continued)

*Primary Examiner* — Bao Long T Nguyen
(74) *Attorney, Agent, or Firm* — Sughrue Mion, PLLC

(57) ABSTRACT

A communication device includes a structure, a controller, and sensors that detect the relative position of an object around the structure. The structure has a face unit that is one of the units of the structure. The controller controls the movement of each unit of the structure, thereby causing the structure to perform a gesture expressing a communication behavior. The controller controls the movement of the units so that the structure performs different gestures depending on the angle between the direction of the face unit and the direction of the user's face as viewed from the face unit.

9 Claims, 13 Drawing Sheets

(56) References Cited

U.S. PATENT DOCUMENTS

| | | | |
|---|---|---|---|
| 2004/0117063 A1* | 6/2004 | Sabe | G05B 19/4097 |
| | | | 700/245 |
| 2009/0173561 A1 | 7/2009 | Moriguchi et al. | |
| 2010/0023163 A1* | 1/2010 | Kidd | G06N 3/008 |
| | | | 700/245 |
| 2014/0005827 A1 | 1/2014 | Ogawa et al. | |
| 2015/0094851 A1 | 4/2015 | Kawabe et al. | |
| 2016/0229063 A1 | 8/2016 | Ishiguro | |
| 2018/0333862 A1* | 11/2018 | Hayashi | A63H 11/10 |
| 2019/0126157 A1* | 5/2019 | Hayashi | A63H 11/00 |

FOREIGN PATENT DOCUMENTS

| | | |
|---|---|---|
| JP | 2004-042151 A | 2/2004 |
| JP | 2006-212717 A | 8/2006 |
| JP | 2010-110038 A | 5/2010 |
| JP | 2011-115936 A | 6/2011 |
| JP | 2012-051042 A | 3/2012 |
| JP | 2012-161851 A | 8/2012 |
| JP | 2013-239209 A | 11/2013 |
| JP | 2014-008562 A | 1/2014 |
| WO | 2007132571 A1 | 11/2007 |
| WO | 2012/091807 A2 | 7/2012 |
| WO | 2015045844 A1 | 4/2015 |

\* cited by examiner

COMMUNICATION DEVICE

INCORPORATION BY REFERENCE

The disclosure of Japanese Patent Application No. 2016-191838 filed on Sep. 29, 2016 including the specification, drawings and abstract is incorporated herein by reference in its entirety.

BACKGROUND

1. Technical Field

The present disclosure relates to a communication device and, in particular, to a communication device that communicates with a user.

2. Description of Related Art

A communication device (communication robot) that autonomously communicates with a user by gesture and speech is known. In relation to this technology, Japanese Patent Application Publication No. 2013-239209 (JP 2013-239209 A) discloses a communication robot that performs the behavior of communication with a human being using at least one of gestures (physical movement), such as body and hand motion, and voices.

The communication robot according to Japanese Patent Application Publication No. 2013-239209 (JP 2013-239209 A) determines physical movements according to the size of one area selected in response to a human question. In addition, the communication robot according to Japanese Patent Application Publication No. 2013-239209 (JP 2013-239209 A) determines the contents of the voice according to the positional relationship among the selected one area, the robot itself, and the human being. The communication robot according to Japanese Patent Application Publication No. 2013-239209 (JP 2013-239209 A) has a body, right and left arms, and a head unit. On the head unit, a speaker is provided at a position corresponding to the mouth of a person, microphones are provided at positions each corresponding to a human ear, and an eyeball unit, including a camera, is provided at positions each corresponding to a human eye.

SUMMARY

A communication robot gives a sense of security to the user by moving according to the surrounding situation. On the other hand, if the robot performs the same gesture irrespective of whether or not a person (user), with whom communication is to be carried out, is present on the front side (face unit side) of the head unit of the robot (structure), there is a possibility of giving an unfriendly (impersonal) impression to the user. In such a case, the user may feel that he or she is not communicating naturally with the communication robot. It is therefore desirable for a communication robot to perform gesture in consideration of the orientation of the user with respect to the communication robot (structure).

The present disclosure provides a communication device capable of performing a natural communication behavior in consideration of the orientation of the user with respect to the face unit of the structure.

An aspect of the present disclosure is a communication device that performs a communication behavior for a user. The communication device includes a structure that includes a plurality of units and has a face unit having at least one unit that includes a face; a controller configured to cause the structure to perform a gesture by controlling a movement of the units, the gesture expressing the communication behavior; and at least one sensor configured to detect a position of an object around the structure, the position being relative to the structure, wherein the at least one sensor is configured to detect a position of a user's face and the controller is configured to control the movement of the units such that the structure performs different gestures according to an angle between a direction in which the face unit faces and a direction of the user's face as viewed from the face unit.

The aspect of the present disclosure, which is configured as described above, allows the gesture to be changed according to the direction of the user with respect to the structure. Accordingly, since the structure can express that communication is performed in consideration of the direction of the user, it is possible to reduce the possibility of giving an unfriendly impression to the user. Therefore, the aspect of the present disclosure makes it possible to perform a natural communication behavior in consideration of the orientation of the user with respect to the face unit of the structure.

The controller may be configured to control the movement of the units such that the structure performs a first gesture if the angle is smaller than a predetermined threshold and may be configured to control the movement of the units such that the structure performs a second gesture if the angle is equal to or larger than the threshold, the second gesture being different from the first gesture. The aspect of the present disclosure, which is configured as described above, allows the gesture to be performed differently between when the user is in front of the structure and when the user is not. Accordingly, since the structure can express more explicitly that communication is performed in consideration of the direction of the user, it is possible to further reduce the possibility of giving an unfriendly impression to the user. Therefore, the aspect of the present disclosure makes it possible to perform a natural communication behavior in consideration of the orientation of the user with respect to the face unit of the structure.

A movement range of the units in the second gesture may be larger than a movement range of the units in the first gesture. The aspect of the present disclosure, which is configured as described above, can perform a gesture that makes it easier for the user to visually recognize it when the user is not in front of the structure. Accordingly, since the structure can express more explicitly that communication is performed in consideration of the direction of the user, it is possible to further reduce the possibility of giving an unfriendly impression to the user. Therefore, the aspect of the present disclosure makes it possible to perform a natural communication behavior in consideration of the orientation of the user with respect to the face unit of the structure.

The controller may be configured to control the movement of the units such that any of the units not moving in the first gesture moves in the second gesture to make it easier for the user to visually recognize the movement in the second gesture from the detected position of the user's face. The aspect of the present disclosure, which is configured as described above, reduces the possibility that, even when the user is not in front of the structure, a unit expressing a gesture will be hidden by other units. Therefore, the aspect of the present disclosure reduces the possibility that the user cannot visually recognize the gesture. That is, the aspect of the present disclosure makes it easier for the user to visually recognize the gesture, Accordingly, since the structure can express more explicitly that communication is performed in consideration of the direction of the user, it is possible to further reduce the possibility of giving an unfriendly impression to the user. Therefore, the communication device of the present disclosure makes it possible to perform a natural communication behavior in consideration of the orientation of the user with respect to the face unit of the structure.

The controller may be configured to control the movement of the units such that the structure performs different gestures depending on whether a part of the user's face detected by the at least one sensor is hidden by an obstacle. The aspect of the present disclosure, which is configured as described above, reduces the possibility that the user cannot visually recognize a gesture of the structure because the gesture is hidden by an obstacle. In other words, the aspect of the present disclosure can make it easier for the user to visually recognize a gesture. Accordingly, since the structure can express more explicitly that communication is performed in consideration of an obstacle, it is possible to further reduce the possibility of giving an unfriendly impression to the user. Therefore, the communication device of the present disclosure makes it possible to perform a natural communication behavior in consideration of an obstacle.

The controller may be configured to control the movement of the units such that the structure performs a third gesture if the angle is smaller than a predetermined threshold and a part of the user's face is hidden by an obstacle, may be configured to control the movement of the units such that the structure performs a fourth gesture if the angle is equal to or larger than the threshold and a part of the user's face is hidden by an obstacle, and may be configured to control the movement of the units so as to reduce a possibility that a part of the user's face will be hidden by the obstacle in the third gesture and the fourth gesture, wherein a movement range of the units in the fourth gesture may be larger than a movement range of the units in the third gesture.

The controller may be configured to analyze image data captured by the at least one sensor for recognizing the user's face and, if the user's face in the image data is invisible at a predetermined ratio or higher, may be configured to determine that a part of the user's face is hidden by the obstacle.

If an obstacle detected by the at least one sensor interferes with the movement range of the units, the controller may be configured to limit the movement of the units to prevent the units from contacting the obstacle.

The structure has an arm unit corresponding to an arm and the controller may be configured to control the movement such that only the arm unit moves in the first gesture and that the arm unit and the face unit move in the second gesture.

The present disclosure can provide a communication device capable of performing a natural communication behavior in consideration of the orientation of the user with respect to the face unit of the structure.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS (First Embodiment)

Figure 1:
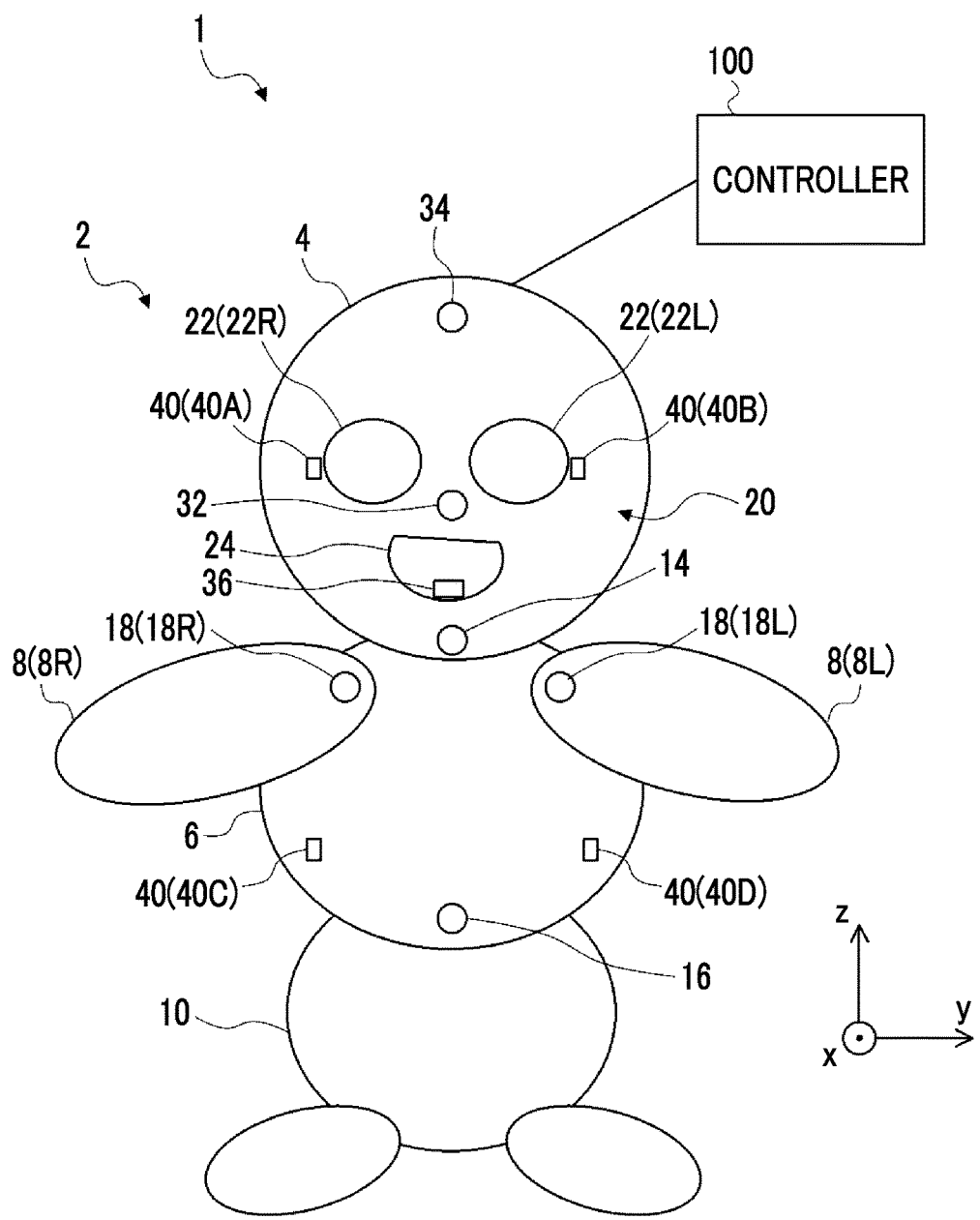
FIG. 1 is a diagram showing a communication device according to a first embodiment.

Embodiments of the present disclosure will be described below with reference to the drawings. FIG. 1 is a diagram showing a communication device 1 according to a first embodiment. The communication device 1 performs the behavior of communication with the user around the communication device 1. A communication behavior is a user perceivable behavior that is performed to convey information and feeling to the user. More specifically, the communication device 1 performs, for example, a predetermined gesture according to the surrounding situation or the user's speech situation. For example, the communication device 1 carries out conversation with the user by speaking to the user according to the surrounding situation or the user's speech situation.

The communication device 1 has a structure 2 and a controller 100. The structure 2 is a structure that expresses a communication behavior such as that of a robot. The controller 100 has the function as a control unit. The controller 100 controls the movement of the structure 2. The structure 2 is composed of a plurality of units. More specifically, the structure 2 has the units such as a head unit 4, a body unit 6, arm units 8, and a base unit 10.

The head unit 4 corresponds to a human head. The body unit 6 corresponds to a human body. The arm unit 8 corresponds to a human arm. The base unit 10, a unit in contact with the ground (floor), supports the body unit 6. The head unit 4 is supported on the body unit 6 via a neck joint unit 14. The arm unit 8 is supported on the body unit 6 via an arm joint unit 18. The body unit 6 is supported on the base unit 10 via a body joint unit 16. The arm unit 8 is composed of an arm unit 8R corresponding to the right arm and an arm unit 8L corresponding to the left arm. The arm unit 8R is supported on the body unit 6 via an arm joint unit 18R. The arm unit 8L is supported on the body unit 6 via an arm joint unit 18L. In the description below, the three-dimensional space represented by the x-axis, y-axis, and z-axis is assumed for the sake of convenience. The positive direction of the x-axis is in the direction from the front of the body unit 6 of the structure 2 toward the front direction (the direction toward the front of FIG. 1). The positive direction of the y-axis is in the direction of the arm unit 8L (right direction in FIG. 1) as viewed from the body unit 6 of the structure 2. The positive direction of the z-axis is in the upward direction as viewed from the body unit 6 of the structure 2. This three-dimensional space, which is based on the body unit 6, can change with the movement of the body unit 6.

The neck joint unit 14, which includes one or more motors (servomotors) controlled by the controller 100, rotates around a number of axes corresponding to the number of motors. This rotation causes the head unit 4 to move relative to the body unit 6. For example, the neck joint unit 14 is configured to have three motors and rotate around the three axes, respectively. When the neck joint unit 14 rotates around the rotation axis parallel to the x-axis, the head unit 4 moves to tilt (swing) to the left or right about the neck joint unit 14. When the neck joint unit 14 rotates around the rotation axis parallel to the y-axis, the head unit 4 moves to shake (nod) up and down about the neck joint unit 14. When the neck joint unit 14 rotates around the rotation axis parallel to the z-axis, the head unit 4 moves to turn left and right (rotates) about the neck joint unit 14.

The arm joint unit 18, which includes one or more motors (servo motors) controlled by the controller 100, rotates around a number of axes corresponding to the number of motors. This rotation causes the arm unit 8 to move relative to the body unit 6. For example, the arm joint unit 18 is configured to have three motors and rotate around the three axes, respectively. When the arm joint unit 18 rotates around the rotation axis parallel to the x-axis, the arm unit 8 moves to swing up and down about the arm joint unit 18. When the arm joint unit 18 rotates around the rotation axis parallel to the y-axis, the arm unit 8 moves to twist the arm unit 8 about the arm joint unit 18. When the arm joint unit 18 rotates around the rotation axis parallel to the z-axis, the arm unit 8 moves to swing back and forth about the arm joint unit 18.

The body joint unit 16, which includes one or more motors (servomotors) controlled by the controller 100, rotates around a number of axes corresponding to the number of motors. This rotation causes the body unit 6 to move relative to the base unit 10. For example, the body joint unit 16 is configured to have three motors and rotate around the three axes, respectively. When the body joint unit 16 rotates around the rotation axis parallel to the x-axis, the body unit 6 moves to tilt (swing) to the left or right about the body joint unit 16. When the body joint unit 16 rotates around the rotation axis parallel to the y-axis, the body unit 6 moves to tilt up and down (nod) about the body joint unit 16. When the body joint unit 16 rotates around the rotation axis parallel to the z-axis, the body unit 6 moves to turn left and right (rotate) about the body joint unit 16.

On the front of the head unit 4 of the structure 2, a face unit 20 is provided as a unit of the structure 2. The face unit 20 includes at least one unit corresponding to the units (eyes, mouth, etc.) constituting a human face. In the example shown in FIG. 1, the face unit 20 has an eye unit 22 corresponding to a human eye and a mouth unit 24 corresponding to the mouth of a human being. The eye unit 22 is composed of an eye unit 22R corresponding to the right eye and an eye unit 22L corresponding to the left eye.

The structure 2 has a camera 32 that captures surrounding objects, a microphone 34 that collects surrounding sounds, and a speaker 36 that emits voices. For example, the camera 32, the microphone 34, and the speaker 36 are provided in the face unit 20. The structure 2 also has a distance sensor 40 for detecting the distance to a surrounding object. In this embodiment, the camera 32, the microphone 34, and the distance sensor 40 are configured as sensors (detection units) for detecting the relative position of an object around the structure 2. An "object" mentioned here is a concept including a person (user).

The distance sensor 40 includes a distance sensor 40A provided near the eye unit 22R, a distance sensor 40B provided near the eye unit 22L, a distance sensor 40C provided on the right side of the body unit 6, and a distance sensor 40D provided on the left side surface of the body unit 6. The distance sensor 40A detects the position of an object existing on the right side of the head unit 4. The distance sensor 40B detects the position of an object existing on the left side of the head unit 4. The distance sensor 40C detects the position of an object existing on the right side of the body unit 6 (below the arm unit 8R). The distance sensor 40 D detects the position of an object existing on the left side of the body unit 6 (below the arm unit 8 L).

Not one but two or more cameras 32 may be provided. For example, the camera 32 may be installed not only on the front side (face unit 20) of the head unit 4 but also on the rear side of the head unit 4. The cameras, when installed in this way, make it possible to capture images in all directions of the structure 2. Even when one camera 32 is provided on the face unit 20, the neck joint unit 14 may make one revolution around the rotation axis parallel to the z-axis to capture the image in all directions of the structure 2. The camera 32 that is an omnidirectional camera may also be installed at the upper end of the head unit 4 to capture the image in all directions of the structure 2. In addition, the camera 32 may be provided in the eye unit 22R and in the eye unit 22L to detect the distance to an object by using the disparity between the images captured by the cameras 32.

The controller 100 has the function, for example, as a computer. The controller 100 may be mounted inside the structure 2 (robot) or may be connected to the structure 2 so that the controller 100 can communicate with the structure 2 via cable or wirelessly. The controller 100 controls the units of the structure 2 to cause the structure 2 to perform gesture that expresses a communication behavior. That is, in the communication device 1, the controller 100 has the function of a master device and the structure 2 has the function of a slave device.

Figure 2:
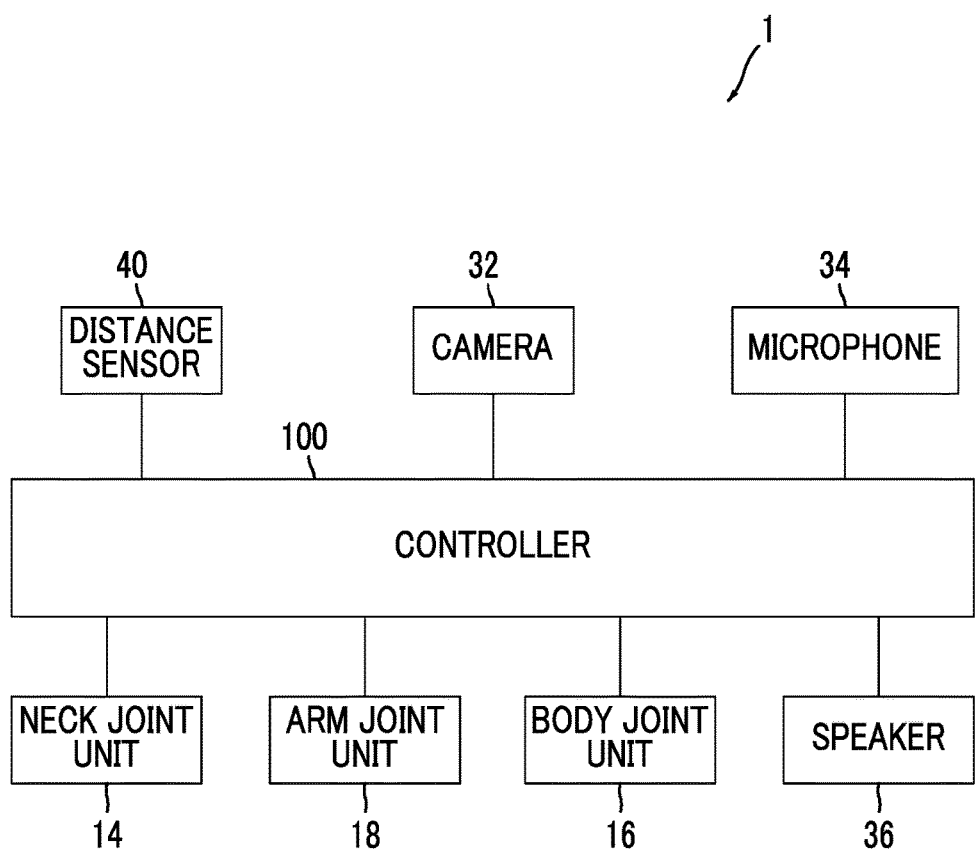
FIG. 2 is a diagram showing a hardware configuration of the communication device according to the first embodiment.

FIG. 2 is a diagram showing a hardware configuration of the communication device 1 according to the first embodiment. The controller 100 is connected to the neck joint unit 14, arm joint unit 18, body joint unit 16, camera 32, microphone 34, distance sensor 40, and speaker 36 via cable or wirelessly. The controller 100 determines the content (expression content), which is to be expressed by the structure 2, based on the information received from at least one of the camera 32, the microphone 34 and the distance sensor 40. After that, the controller 100 controls at least one of the neck joint unit 14, arm joint unit 18, body joint unit 16 and speaker 36 to express the determined expression content.

The "expression content" mentioned above is a behavior (communication behavior) that the structure 2 shows (expresses) to the user so that the communication device 1 can communicate with the user. For example, the "expression content" includes gesture and speech. The gesture, which is a body and hand movement that the user can visually recognize, includes "waving the arm (arm unit 8)" and "shaking the head (the head unit 4) up and down (nod)". The speech is the emission of verbal information (or sound information) aurally recognizable by the user.

For example, when the expression content (communication action) is "to wave the arm", the controller 100 controls the arm joint unit 18 so that the arm unit 8 can move. As a result, the communication device 1 expresses the expression content "waving the arm". Similarly, when the expression content (communication action) is "to greet", the controller 100 controls the speaker 36 so that the voice "Hello" can be generated and then controls the neck joint unit 14 so that the head unit 4 can be tiled up and down. As a result, the communication device 1 expresses the expression content "greeting".

The controller 100 may determine the expression content (communication behavior) according to the user's feeling. More specifically, the controller 100 may analyze the facial expression of the user's face using the camera 32 to determine the expression content (communication behavior) according to the analysis result. In addition, the controller 100 may recognize speech to determine the expression content (communication behavior) according to the resulting speech recognition. More specifically, the controller 100 detects the voice of the user using the microphone 34 and analyzes the tone of the voice or the contents of the speech. Then, from the analysis result, the controller 100 may determine the expression content. This allows the communication device 1 to carry out natural communication according to the user's feeling.

Figure 3:
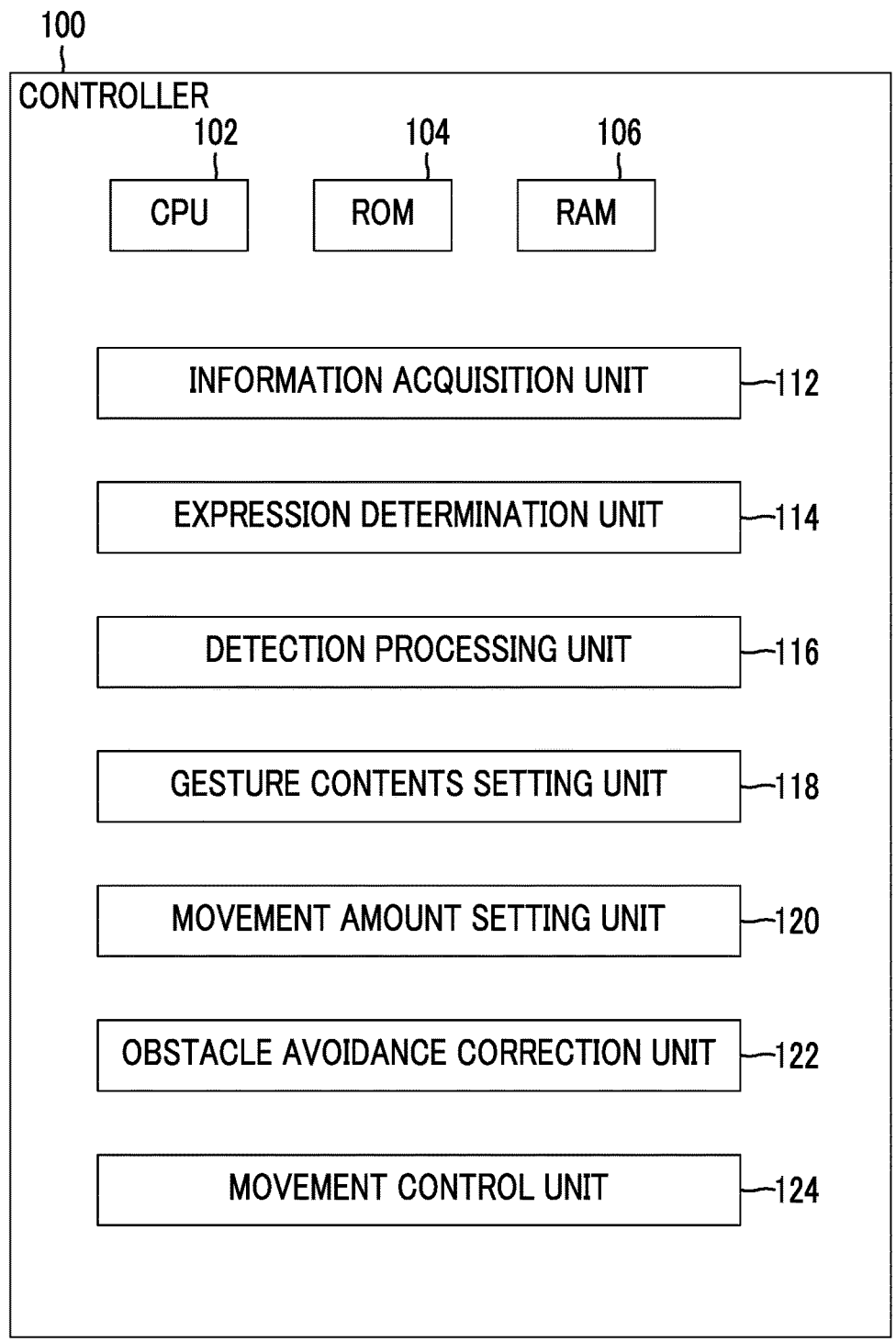
FIG. 3 is a block diagram showing a configuration of a controller according to the first embodiment.

FIG. 3 is a block diagram showing a configuration of the controller 100 according to the first embodiment. As major hardware components, the controller 100 has a Central Processing Unit (CPU) 102, a Read Only Memory (ROM) 104, and a Random Access Memory (RAM) 106. The CPU 102 has the function of an arithmetic unit that performs the control processing and the calculation processing. The ROM 104 has the function of storing a control program and an arithmetic program to be executed by the CPU 102. The RAM 106 has the function of temporarily storing processing data and so on.

The controller 100 includes an information acquisition unit 112, an expression determination unit 114, a detection processing unit 116, a gesture contents setting unit 118, a movement amount setting unit 120, an obstacle avoidance correction unit 122, and a movement control unit 124 (hereinafter, these units are called components). The information acquisition unit 112, expression determination unit 114, detection processing unit 116, gesture contents setting unit 118, movement amount setting unit 120, obstacle avoidance correction unit 122, and movement control unit 124 respectively have the function as a unit that acquires information, a unit that determines whether to express a communication behavior, a unit that determines whether there is a person or an obstacle, a unit that sets gesture contents, a unit that sets a movement amount, a unit that corrects a movement to avoid obstacle, and a unit that controls a movement. Each component can be implemented by the CPU 102 executing a program stored in the ROM 104. It is also possible to record a necessary program in a nonvolatile recording medium for later installation as necessary. Each component may be implemented not only by software as described above but also by hardware such as a circuit device. The function of each component will be described below with reference to the flowcharts (FIGS. 4 to 7).

Figure 4:
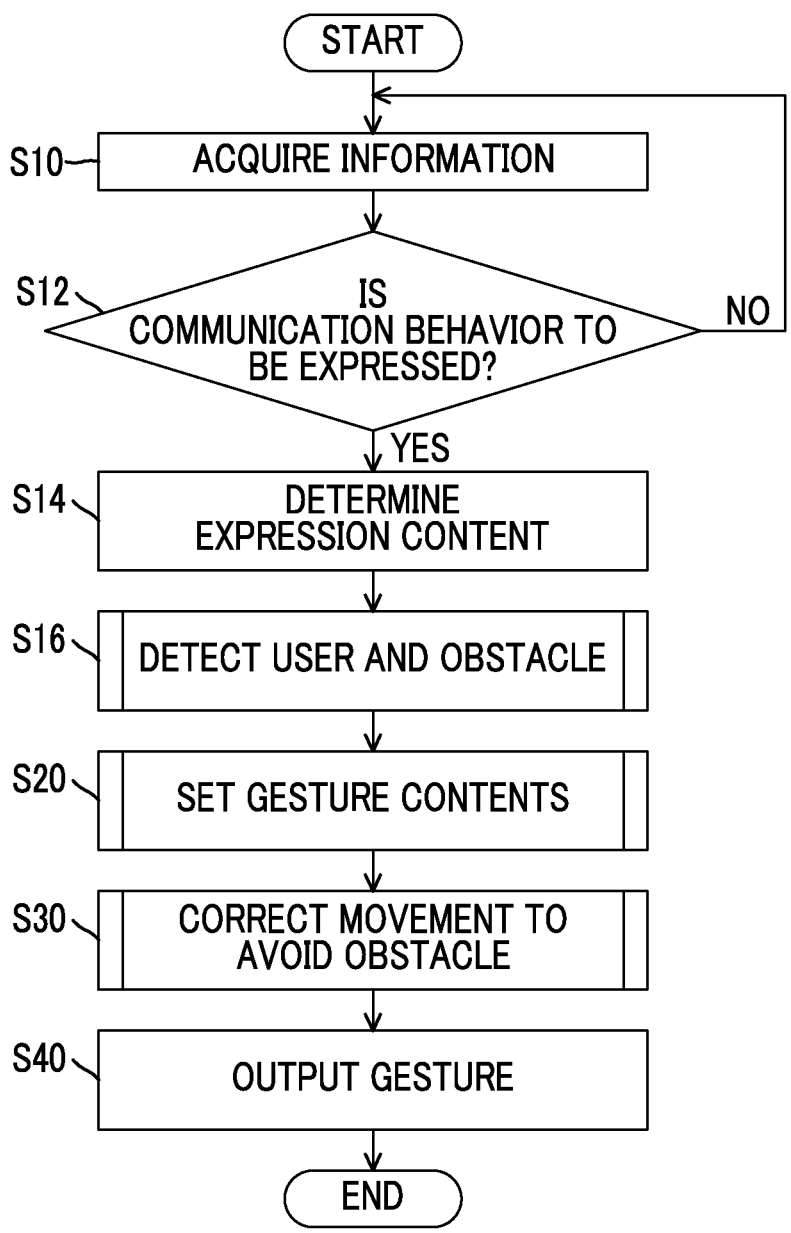
FIG. 4 is a flowchart showing a method of controlling the structure performed by the controller according to the first embodiment.
Figure 5:
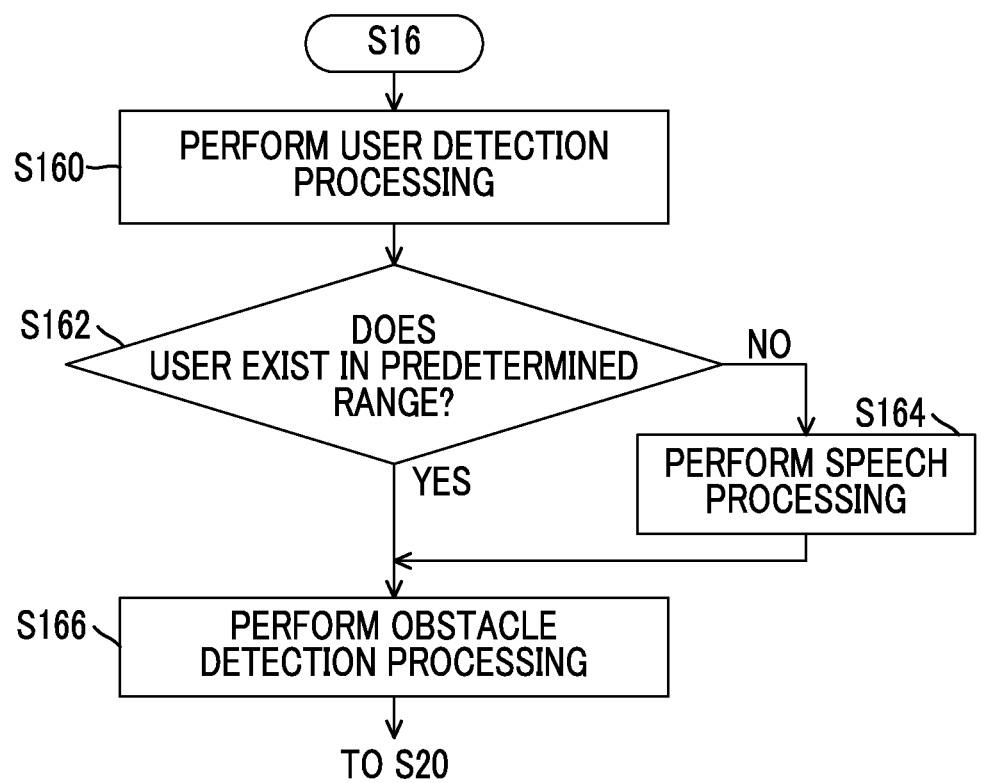
FIG. 5 is a flowchart showing a method of controlling the structure performed by the controller according to the first embodiment.
Figure 6:
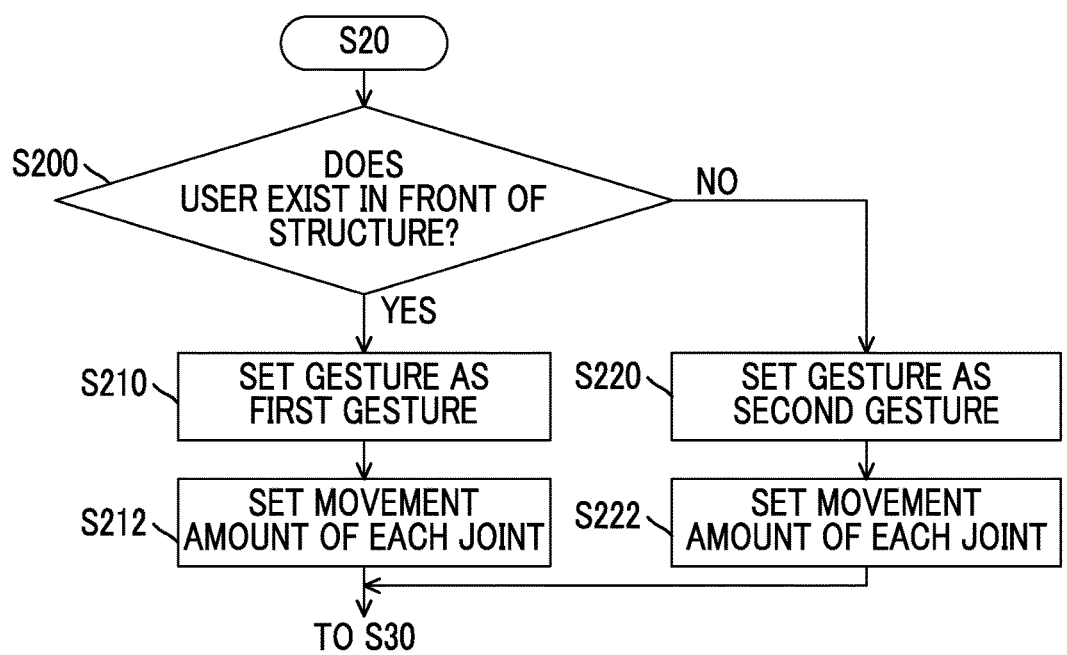
FIG. 6 is a flowchart showing a method of controlling the structure performed by the controller according to the first embodiment.
Figure 7:
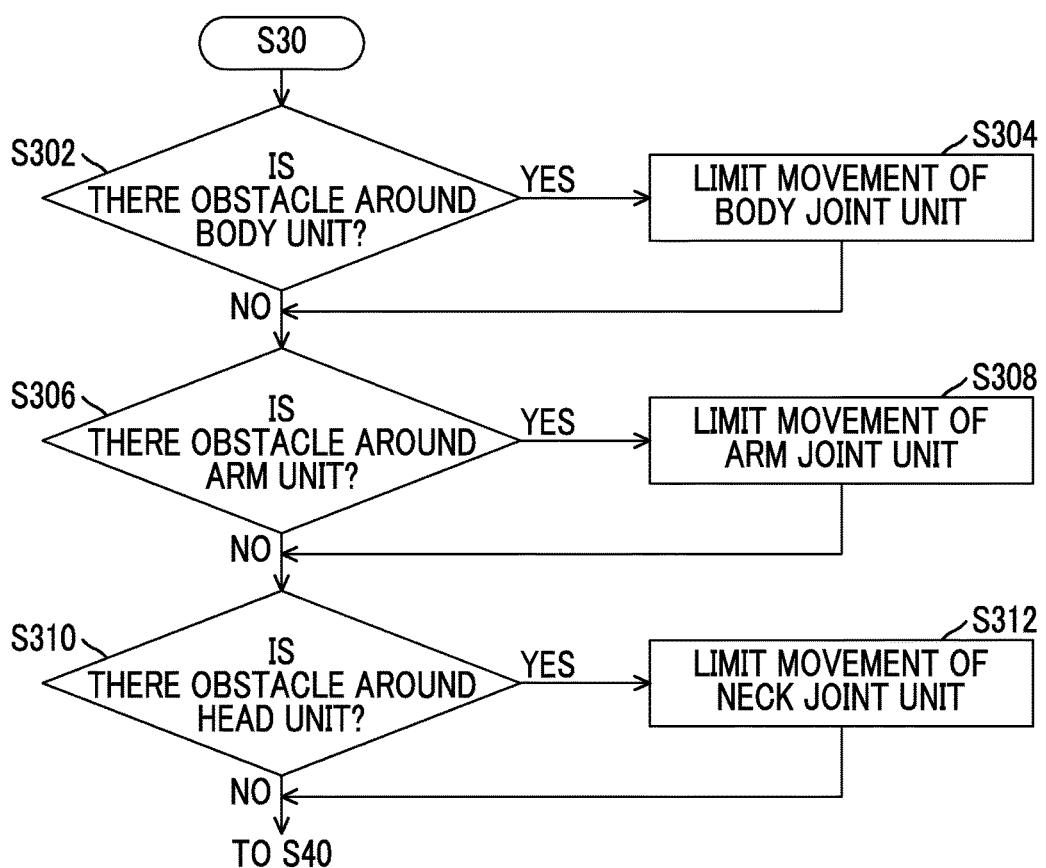
FIG. 7 is a flowchart showing a method of controlling the structure performed by the controller according to the first embodiment.

FIGS. 4 to 7 are flowcharts showing the control method of the structure 2 performed by the controller 100 according to the first embodiment. FIG. 4 shows the method performed by the controller 100 to control the structure 2 so that the structure 2 to perform a gesture. FIG. 5 shows the detail of the processing in S16. FIG. 6 shows the detail of the processing in S20. FIG. 7 shows the detail of the processing in S30.

The controller 100 acquires the information (step S10). Specifically, the information acquisition unit 112 acquires the information necessary for determining a time at which a communication behavior is to be expressed. More specifically, the information acquisition unit 112 acquires voice data using the microphone 34. The information acquisition unit 112 also acquires image data captured by the camera 32. The information acquisition unit 112 also acquires the distance information, which indicates the distance to an object, using the distance sensor 40. The information acquisition unit 112 also acquires the structure information indicating the state of the structure 2 itself.

Next, the controller 100 determines whether to express a communication behavior (step S12). More specifically, the expression determination unit 114 uses the information, acquired by the processing in S10, to determine whether it is a time to express a communication behavior. If the expression determination unit 114 determines not to express a communication behavior (NO in S12), the processing returns to S10. On the other hand, if the expression determination unit 114 determines to express a communication behavior (YES in S12), the expression determination unit 114 determines the expression content (step S14). In other words, the expression determination unit 114 determines what type of communication behavior is to be performed. Non-verbal communication, if performed in a timely way as described above, allows the structure 2 to give the user an impression that the structure 2 appears to be a living thing, further enhancing the user's interaction motivation. The following are some examples showing in which situation the expression determination unit 114 determines to express a communication behavior and what communication behavior the expression determination unit 114 determines to perform as the expression content.

For example, if it is determined from the speech recognition result that the user's speech has been completed (YES in S12), the expression determination unit 114 determines to express the communication behavior corresponding to the completion of the speech (S14). In this case, the expression determination unit 114 removes noises from the acquired voice data to extract only the speech information indicating the user's speech. Then, based on the extracted speech information, the expression determination unit 114 analyzes a change in the volume and frequency of the user's voice to determine that the user's speech is completed. In addition, as the expression content, the expression determination unit 114 determines to perform a communication behavior, which appears to express agreement, by oscillating the head unit 4 up and down.

Furthermore, if the user appears (YES in S12), the expression determination unit 114 determines to express the communication behavior corresponding to the appearance of the user (S14). The expression determination unit 114 determines that the user appears, for example, when, when a person enters the room in which the communication device 1 (structure 2) is placed. In this case, the expression determination unit 114 detects a person from the acquired image data. Then, when a person is detected, the expression determination unit 114 determines that the user has appeared. In addition, as the expression content, the expression determination unit 114 determines to perform the communication behavior, which appears to wave his or her hand, by waving one arm unit 8 up and down.

Furthermore, if the user's feeling changes (YES in S12), the expression determination unit 114 determines to express the communication behavior corresponding to the change in the user's feeling (S14). In this case, from the acquired image data, the expression determination unit 114 analyzes a change in the user's facial expression or a change in the movement (change in the face orientation or the body orientation). If it is determined that a change in the user's facial expression or a change in the movement has occurred, the expression determination unit 114 determines that the user's feeling has changed. In addition, the expression determination unit 114 extracts the user's speech information from the acquired voice data and performs morphological analysis for the extracted speech information for analyzing the content of the speech to detect that the topic has changed. Then, if the topic has changed, the expression determination unit 114 determines that the user's feeling has changed. In addition, as the expression content, the expression determination unit 114 determines to perform a communication behavior that appears to wave hands by swinging both the arm units 8 up and down.

Furthermore, if the state of the structure 2 changes (YES in S12), the expression determination unit 114 determines to express the communication behavior corresponding to the change in the structure 2 (S14). In this case, from the acquired structure information, the expression determination unit 114 determines whether the state of the structure 2 has changed. For example, when the battery remaining capacity of the structure 2 decreases, the expression determination unit 114 determines that the state of the structure 2 has changed. In addition, as the expression content, the expression determination unit 114 determines to perform a communication behavior that appears to be hungry by holding the front of the body unit 6 with both arm units 8 and by tilting the body unit 6 forward.

Next, the controller 100 performs the detection processing for a user and an obstacle (step S16). More specifically, as shown in FIG. 5, the detection processing unit 116 performs the user detection processing (step S160). For example, the detection processing unit 116 may analyze the acquired image data to recognize the user's face (or eyes). The detection processing unit 116 may also extract user's speech information from the acquired voice data.

The detection processing unit 116 determines whether the user exists in a predetermined range (step S162). For example, when the user's face does not exist in a predetermined angle of view in the image data, the detection processing unit 116 may determine that the user does not exist in the predetermined range. If it is determined that the user does not exist in the predetermined range (NO in S162), the detection processing unit 116 performs the speech processing (step S164). On the other hand, if it is determined that the user exists in the predetermined range (YES in S162), the detection processing unit 116 does not perform the speech processing (S164).

In this case, the detection processing unit 116 may perform the speech processing if it is recognized from the voice data that the user is near but if the user's face does not exist in the predetermined angle of view. For example, the structure 2 is located in the living room and the user is present in the kitchen connected to the living room. In such a case, the detection processing unit 116 controls the speaker 36 so that the voices such as "Where are you? Please show you face" will be generated to urge the user to come before the structure 2.

Next, the detection processing unit 116 performs the obstacle detection processing (step S166). More specifically, the detection processing unit 116 acquires the distance information indicating the distance from the distance sensor 40 to an object (obstacle). This allows the controller 100 to detect the position of an obstacle around the structure 2. The "obstacle" in this case is an object that can obstruct the movement of a unit of the structure 2 (or that can interfere with a unit). The obstacle includes a person (user).

For example, the detection processing unit 116 can use the distance information, obtained from the distance sensor 40A, to detect the position of an obstacle on the right side of the head unit 4 (and above the arm unit 8R). Similarly, the detection processing unit 116 can use the distance information, obtained from the distance sensor 40B, to detect the position of an obstacle on the left side of the head unit 4 (and above the arm unit 8L). Similarly, the detection processing unit 116 can use the distance information, obtained from the distance sensor 40C, to detect the position of an obstacle on the right side of the body unit 6 (and below the arm unit 8R). Similarly, the detection processing unit 116 can use the distance information, obtained from the distance sensor 40D, to detect the position of an obstacle on the left side of the body unit 6 (and below the arm unit 8L).

Next, the controller 100 sets gesture contents (step S20). In the description below, the gesture contents refer to the more specific contents of a communication behavior (expression content), indicating where, in which direction, and how much a unit (head unit 4, arm unit 8, body unit 6, etc.) of the structure 2 is to be moved. For example, when the communication behavior is "waving the hand", the gesture contents indicate how much the arm unit 8 is to be swung and where the arm unit 8 is to be swung.

As shown in FIG. 6, the gesture contents setting unit 118 determines whether the user is in front of the structure 2 (step S200). The specific determination method will be described later with reference to FIG. 8. If it is determined that the user is in front of the structure 2 (YES in S200), the gesture contents setting unit 118 sets a gesture, which is to be performed by the structure 2, as the first gesture (first gesture) (step S210). After that, the movement amount setting unit 120 sets the movement amount of each joint (neck joint unit 14, body joint unit 16 and arm joint unit 18) required for the structure 2 to perform the first gesture (step S212).

On the other hand, if it is determined that the user is not in front of the structure 2 (NO in S200), the gesture contents setting unit 118 sets a gesture, which is to be performed by the structure 2, as the second gesture (second gesture) that is different from the first gesture (step S220). After that, the movement amount setting unit 120 sets the movement amount of each joint (neck joint unit 14, body joint unit 16 and arm joint unit 18) required for the structure 2 to perform the second gesture (step S222).

The first gesture is a gesture that serves as a basis for a communication behavior (expression content). On the other hand, the second gesture is a gesture more easily visible to the user than the first gesture. In other words, the second gesture is a gesture that is more conspicuous than the first gesture. Note that the second gesture does not express a behavior completely different from the first gesture. The second gesture also expresses a communication behavior basically the same as that expressed by the first gesture. The following are differences between the first gesture and the second gesture.

For example, the movement range of a unit in the second gesture is larger than the movement range of the unit in the first gesture. For example, when the communication behavior is "waving the hand", the movement range of the arm unit 8 is larger in the second gesture than in the first gesture. Therefore, in the second gesture, the structure 2 appears to the user that the structure 2 is waving the hand more largely.

This means that the second gesture is more visible and conspicuous for the user than the first gesture.

In addition, in the second gesture, a unit that does not move in the first gesture is moved. For example, when the communication behavior is "waving the hand", only the arm unit 8 moves in the first gesture. On the other hand, in the second gesture, not only the arm unit 8 but also the head unit 4, which does not move in the first gesture, moves. Moving the head unit 4 in the second gesture in this way reduces the possibility that the arm unit 8 will be hidden by the head unit 4, meaning that the second gesture is more visible and conspicuous to the user than the first gesture.

In addition, the moving position of a unit is farther away from the position of another unit of the structure 2 in the second gesture than in the first gesture. For example, when the communication behavior is "waving the hand", the arm unit 8 swings at a higher position in the second gesture than in the first gesture. Swinging the arm unit 8 in the second gesture in this way reduces the possibility that the arm unit 8 will be hidden by the body unit 6, meaning that the second gesture is more visible and conspicuous to the user than the first gesture.

The setting of a movement amount will be described below. The movement amount setting unit 120 defines a target posture for a set gesture (first gesture or second gesture). After that, the movement amount setting unit 120 sets the joint angle of each joint (the neck joint unit 14, the body joint unit 16, and the arm joint unit 18) to realize the target posture. The movement amount setting unit 120 calculates the difference (movement amount) between the set target joint angle and the current joint angle. For example, for the first gesture, let $\Delta X$ be the movement amount of the neck joint unit 14, $\Delta Y$ be the movement amount of the body joint unit 16, and $\Delta Z$ be the movement amount of the arm joint unit 18, where $\Delta X$, $\Delta Y$, and $\Delta Z$ are each the vector of the dimension corresponding to the number of rotation axes of each joint. For example, when the neck joint unit 14 rotates around three axes, $\Delta X$ is a three-dimensional vector. Similarly, when the body joint unit 16 rotates around two axes, $\Delta Y$ is a two-dimensional vector.

The movement amount setting unit 120 defines the calculated movement amount by dividing it in such a way that the movement amount changes in stages over time. The number of divisions, N, is determined according to the responsiveness of the motor of each joint and the movement speed of a gesture. Let $X_0$ be the current joint angle of the neck joint unit 14. Then, the joint angle $X_i$ of the neck joint unit 14 in the i-th division (i is an integer equal to or smaller than N) is expressed by equation 1 given below.

$$X_i = X_0 + \frac{i}{N}\Delta X$$

Similarly, let $Y_0$ be the current joint angle of the body joint unit 16. Then, the joint angle $Y_i$ of the body joint unit 16 in the i-th division is expressed by equation 2 give below.

$$Y_i = Y_0 + \frac{i}{N}\Delta Y$$

Similarly, let $Z_0$ be the current joint angle of the body joint unit 18. Then, the joint angle $Z_i$ of the arm joint unit 18 in the i-th division is expressed by equation 3 give below.

$$Z_i = Z_0 + \frac{i}{N}\Delta Z$$

Next, the controller 100 performs correction (obstacle avoidance correction) to avoid an obstacle (step S30). More specifically, as shown in FIG. 7, the obstacle avoidance correction unit 122 determines whether there is an obstacle around the body unit 6 (step S302) based on the result of the obstacle detection processing (S166 in FIG. 5). The obstacle avoidance correction unit 122 determines that there is an obstacle around the body unit 6 if the body unit 6 contacts an obstacle when the body unit is moved according to the set gesture.

If it is determined that there is no obstacle around the body unit 6 (NO in S302), the obstacle avoidance correction unit 122 does not perform the processing in S304 described below. On the other hand, if it is determined that there is an obstacle around the body unit 6 (YES in S302), the obstacle avoidance correction unit 122 limits the movement of the body joint unit 16 so that the body unit 6 does not contact the obstacle (step S304). More specifically, the obstacle avoidance correction unit 122 changes the set amount of the movement of the body joint unit 16 by limiting the rotation angle of the body joint unit 16 so that the rotation range is limited. Limiting the rotation range in this way changes the gesture contents so that the body unit 6 does not come in contact with the obstacle. For example, when the distance sensor 40C senses that the body unit 6 is likely to contact an obstacle on the right side of the body unit 6, the obstacle avoidance correction unit 122 limits the rotation angle of the body joint unit 16 so that the movement of the body unit 6 to the right side is limited.

Similarly, the obstacle avoidance correction unit 122 determines whether there is an obstacle around the arm unit 8 (step 5306) based on the result of the obstacle detection processing (S166 in FIG. 5). The obstacle avoidance correction unit 122 determines that there is an obstacle around the arm unit 8 if the arm unit 8 contacts an obstacle when the arm unit 8 is moved according to the set gesture. In this case, the obstacle avoidance correction unit 122 may determine whether the arm unit 8 contacts an obstacle when the arm unit 8 is moved according to the set gesture with the movement of the body joint unit 16 limited by the processing in S304.

If it is determined that there is no obstacle around the arm unit 8 (NO in S306), the obstacle avoidance correction unit 122 does not perform the processing of S308 described below. On the other hand, if it is determined that there is an obstacle around the arm unit 8 (YES in S306), the obstacle avoidance correction unit 122 limits the movement of the arm joint unit 18 so that the arm unit 8 does not contact the obstacle (step S308). More specifically, the obstacle avoidance correction unit 122 changes the set amount of the movement of the arm joint unit 18 by limiting the rotation angle of the arm joint unit 18 so that the rotation range is limited. Limiting the rotation range in this way changes the gesture contents so that the arm unit 8 does not come in contact with the obstacle. For example, when the distance sensor 40D senses that the arm unit 8 is likely to contact an obstacle on the underside of the arm unit 8L on the left side, the obstacle avoidance correction unit 122 limits the rotation angle of the arm joint unit 18 so that the movement of the arm unit 8L to the downward side is limited.

Similarly, the obstacle avoidance correction unit 122 determines whether there is an obstacle around the head unit 4 (step S310) based on the result of the obstacle detection processing (S166 in FIG. 5). The obstacle avoidance correction unit 122 determines that there is an obstacle around the head unit 4 if the head unit 4 contacts an obstacle when the head unit 4 is moved according to the set gesture. In this case, the obstacle avoidance correction unit 122 may determine whether the head unit 4 contacts an obstacle when the head unit 4 is moved according to the set gesture with the movement of the body joint unit 16 limited by the processing in S304.

If it is determined that there is no obstacle around the head unit 4 (NO in S310), the obstacle avoidance correction unit 122 does not perform the processing of S312 described below. On the other hand, if it is determined that there is an obstacle around the head unit 4 (YES in S310), the obstacle avoidance correction unit 122 limits the movement of the neck joint unit 14 so that the head unit 4 does not contact the obstacle (step S312). More specifically, the obstacle avoidance correction unit 122 changes the set amount of the movement of the neck joint unit 14 by limiting the rotation angle of the neck joint unit 14 so that the rotation range is limited. Limiting the rotation range in this way changes the gesture contents so that the head unit 4 does not come in contact with the obstacle. For example, when the distance sensor 40A senses that the head unit 4 is likely to contact an obstacle on the right side of the head unit 4, the obstacle avoidance correction unit 122 limits the rotation angle of the neck joint unit 14 so that the movement of the head unit 4 to the right side is limited.

In this way, the communication device 1 according to this embodiment reduces the possibility that the structure 2 will contact an obstacle. Therefore, the communication device 1 allows the user to feel as if the structure 2 was acting in consideration of the circumstances, thus giving the user a sense of security.

Next, the controller 100 controls the structure 2 so that the structure 2 can express the gesture contents (step S40). More specifically, the movement control unit 124 controls the motor of each joint so that each joint (the neck joint unit 14, the body joint unit 16 and the arm joint Unit 18) works based on the movement amount (rotation angle) that is set in S20 and is limited by the processing in S30. Controlling the joints in this way enables the structure 2 to express (play) the set gesture contents.

Figure 8:
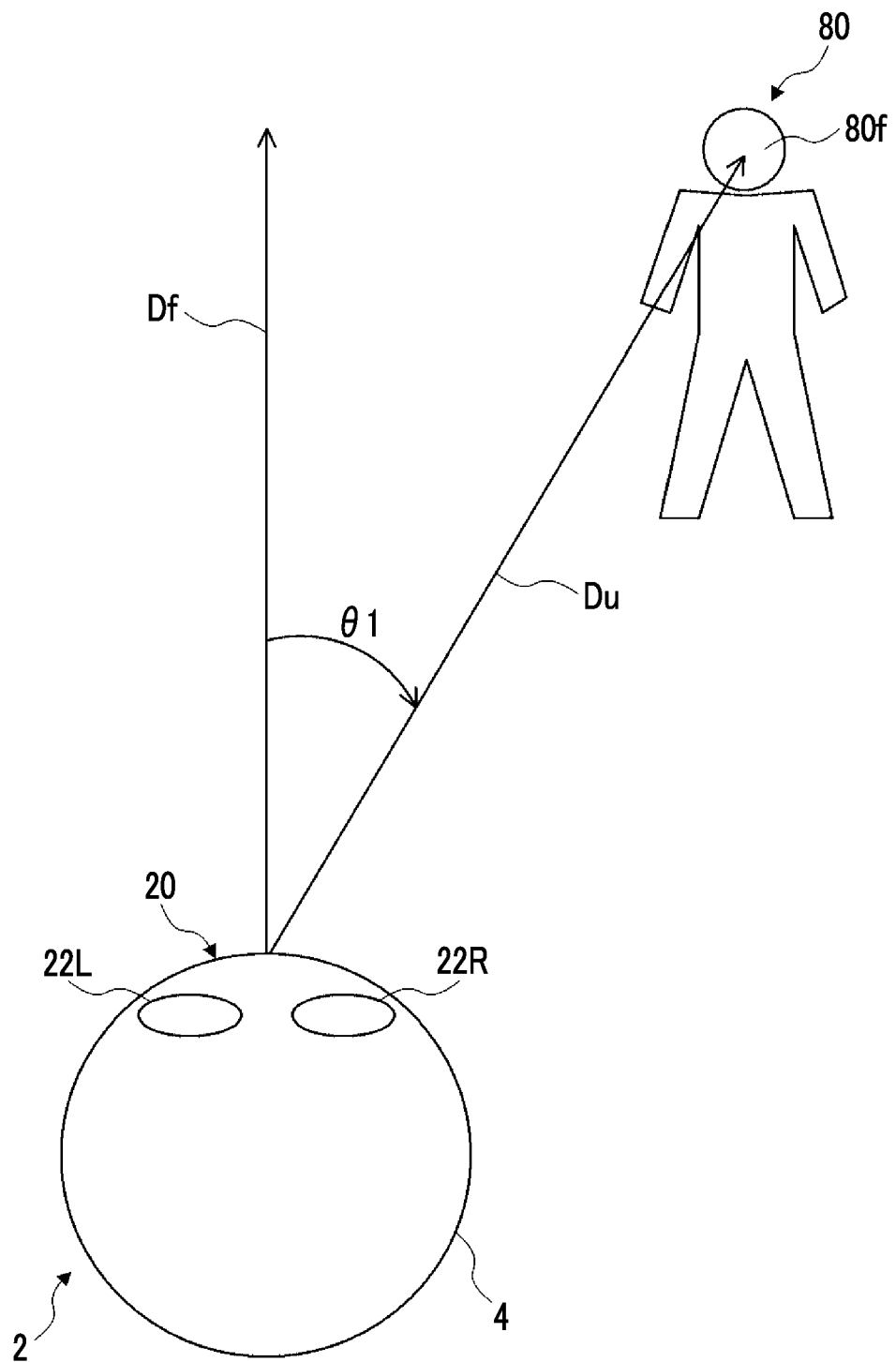
FIG. 8 is a diagram showing a method of determining whether a user exists in front of the structure.

Next, the method of determining whether the user exists in front of the structure 2, which is performed in the processing in S200, will be described. FIG. 8 is a diagram showing the method of determining whether the user exists in front of the structure 2. Let Df be the direction in which the face unit 20 of the structure 2 faces, that is, the direction in which the front of the face unit 20 faces. Let Du be the direction of a face 80f of a user 80 as viewed from the face unit 20. That is, Du is the direction in which the face unit 20 faces the face 80f of the user 80. In this case, let θ1 be the angle of the direction Du with respect to the direction Df, that is, the angle formed between the direction Df and the direction Du. Then, the gesture contents setting unit 118 determines that the user 80 exists in front of the structure 2 if the angle θ1 is smaller than a predetermined threshold θth.

Therefore, if the angle θ1 is smaller than the threshold θth, the gesture contents setting unit 118 sets the gesture, which is to be performed by the structure 2, as the first gesture (S210). On the other hand, if the angle θ1 is equal to or larger than the threshold θth, the gesture contents setting unit 118 sets the gesture, which is to be performed by the structure 2, as the second gesture (S220). The threshold θth is approximately 15 degrees but is not limited thereto. In addition, the angle θ1 may be 0 degree or larger and 180 degrees or smaller in the left direction and in the right direction from the front direction Df of the face unit 20. Furthermore, the angle θ1 may be 0 degree or larger and 360 degrees or smaller with the clockwise direction being positive. At this time, the angle on the left side with respect to the front direction Df of the face unit 20 may be indicated as negative. In this case, "the angle θ1 is equal to or larger than the threshold θth" means that "the absolute value of the angle θ1" is equal to or larger than the threshold θth. Similarly, "the angle θ1 is smaller than the threshold θth" means that "the absolute value of the angle θ1" is smaller than the threshold θth. Therefore, "the angle θ1 is equal to or larger than the threshold θth" means that the user is not in front of the face unit 20 of the structure 2. Similarly, "the angle θ1 is smaller than the threshold θth" means that the user is in front of the face unit 20 of the structure 2.

There exist various methods for the controller 100 to measure the angle θ1. One of the methods is to use the image data acquired by the camera 32. For example, in the image data photographed in the front direction of the face unit 20, the pixel position (coordinates) P0 in the direction in which the face unit 20 faces can be determined in advance. The gesture contents setting unit 118 performs the face recognition processing to calculate the pixel position (coordinates) P1 of the user's face in the image data. The gesture contents setting unit 118 can calculate the distance L to the user's face, based on the focal length (or the size of the user's face in the image data) when the user's face is focused. Then, from P0, P1, and the distance L obtained as described above, the gesture contents setting unit 118 can geometrically calculate the angle θ1. In addition, when using the method of capturing the surroundings of the structure 2 by horizontally rotating the camera 32 or the neck joint unit 14, the angle θ1 can be obtained from the angle of the camera 32 or the neck joint unit 14 when the user exists in front of the camera 32.

Figure 9:
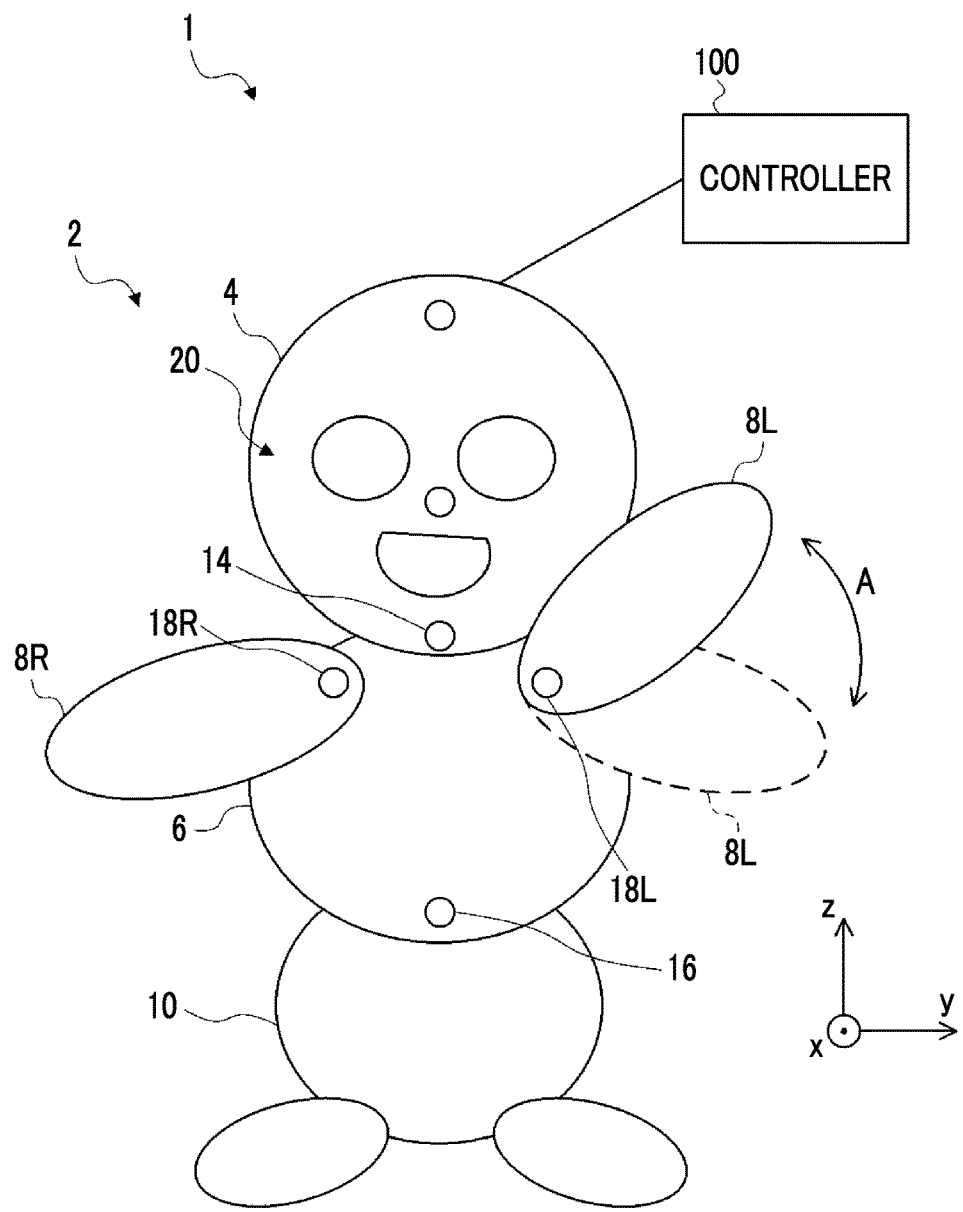
FIG. 9 is a diagram showing a specific example of a first gesture according to the first embodiment.

Next, a specific example of gesture contents used in the first embodiment will be described. In the specific example described below, the communication behavior is "waving the left hand". FIG. 9 is a diagram showing a specific example of the first gesture according to the first embodiment. As described above, the first gesture illustrated in FIG. 9 is a gesture that forms the basis of the communication behavior "wave the left hand".

As shown in FIG. 9, the controller 100 controls the arm joint unit 18L so that it rotates around the rotation axis parallel to the x-axis. As a result, the arm unit 8L swings up and down about the arm joint unit 18L as indicated by the arrow A. In this way, the first gesture is expressed. Therefore, the structure 2 appears to the user that the structure 2 is waving the left hand.

The controller 100 makes the range of the rotation angle of the arm joint unit 18 larger in the second gesture than in the first gesture. Thus, the range, in which the arm unit 8L swings up and down, is larger in the second gesture than in the first gesture. Therefore, the second gesture is more visible and conspicuous to the user than the first gesture.

Figure 10:
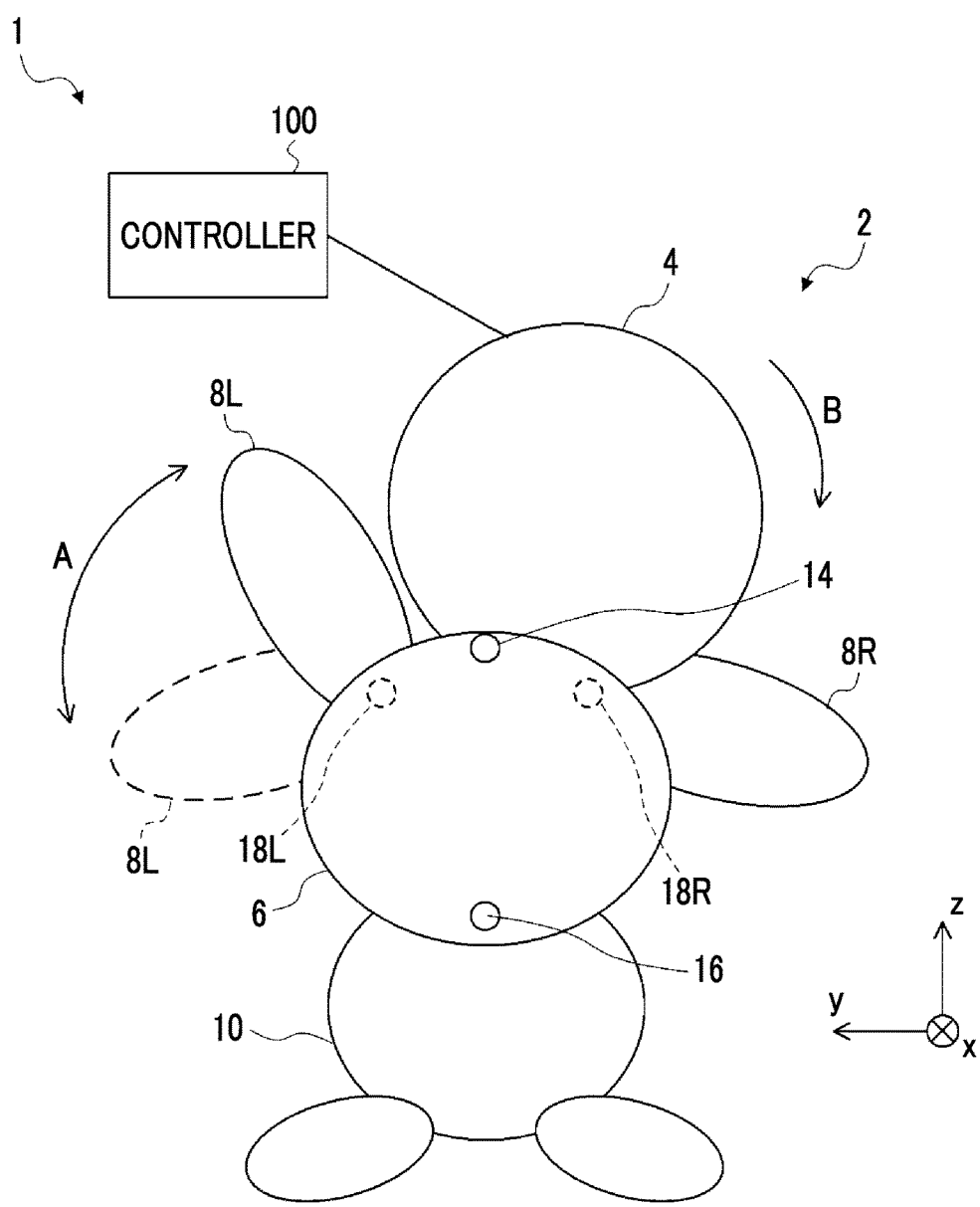
FIG. 10 is a diagram showing one specific example of a second gesture according to the first embodiment.

FIG. 10 is a diagram showing one specific example of the second gesture according to the first embodiment. FIG. 10 is a view of the structure 2 viewed from the rear side (behind). FIG. 10 shows an example of the second gesture that is expressed when the user is on rear side of (behind) the structure 2. The gesture contents setting unit 118 may set the second gesture so that the second gesture shown in FIG. 10 is expressed, for example, when the angle θ1 is 120 degrees or larger. In this case, the threshold θth is 120 degrees.

In the example shown in FIG. 10, the controller 100 rotates the neck joint unit 14 slightly clockwise around the rotation axis parallel to the x-axis. This rotation causes the head unit 4 to be tilted to the right centering around the neck joint unit 14 as indicated by the arrow B. Thus, the head unit 4, which does not move in the first gesture, moves in the second gesture, reducing the possibility that the arm unit 8 will be hidden by the head unit 4. This makes it easier for the user to visually recognize the movement of the arm unit 8L even from behind the structure 2. In other words, the second gesture is more conspicuous than the first gesture. In this way, the controller 100 causes the structure 2 to perform the second gesture, in which a unit that does not move in the first gesture moves, so that the movement corresponding to the first gesture can be easily recognized visually from the position of the detected user's face.

The controller 100 controls the movement of the arm joint unit 18 so that the arm unit 8L swings upward in the second gesture than in the first gesture. This control reduces the possibility that the movement of the arm unit 8L will be hidden by the body unit 6, making it easier for the user to visually recognize the movement of the arm unit 8L. In other words, the second gesture is more conspicuous than the first gesture. In addition, increasing the swinging range of the arm unit 8L allows the user to easily recognize the movement of the arm unit 8L. In other words, the second gesture is more conspicuous than the first gesture.

As described above, the communication device 1 according to the first embodiment is configured to cause the structure 2 to perform the gesture differently between when the user is in front of the face unit 20 of the structure 2 and when the user is not. This means that the structure 2 can express that the structure 2 is performing a communication behavior considering the orientation of the user with respect to the face unit 20. This expression method reduces the possibility of giving an unfriendly impression to the user. Therefore, the communication device 1 according to the first embodiment can perform natural communication considering the orientation of the user with respect to the face unit 20 of the structure 2.

The communication device 1 according to the first embodiment is configured to cause the structure 2 to perform a conspicuous gesture when the user is away from the front of the face unit 20. Therefore, the structure 2 can express that the structure 2 is performing a gesture that is easily noticeable by the user considering the orientation of the user with respect to the face unit 20. This configuration further reduces the possibility of giving an unfriendly impression to the user. Thus, the communication device 1 according to the first embodiment can perform more natural communication considering the orientation of the user with respect to the face unit 20 of the structure 2.

(Second Embodiment)

Next, a second embodiment will be described. The second embodiment is different from the first embodiment in that the second embodiment takes into consideration an obstacle existing between the user and a structure 2. Since the hardware configuration of a communication device 1 according to the second embodiment is substantially the same as the hardware configuration of the communication device 1 according to the first embodiment, the description will be omitted. In addition, since the configuration of a controller 100 according to the second embodiment is substantially the same as that shown in FIG. 3, the description will be omitted. Furthermore, since the control method of the structure 2 performed by the controller 100 is substantially the same as the control method shown in the flowchart in FIG. 4 except S20, the description of processing other than that of processing in S20 will be omitted.

Figure 11:
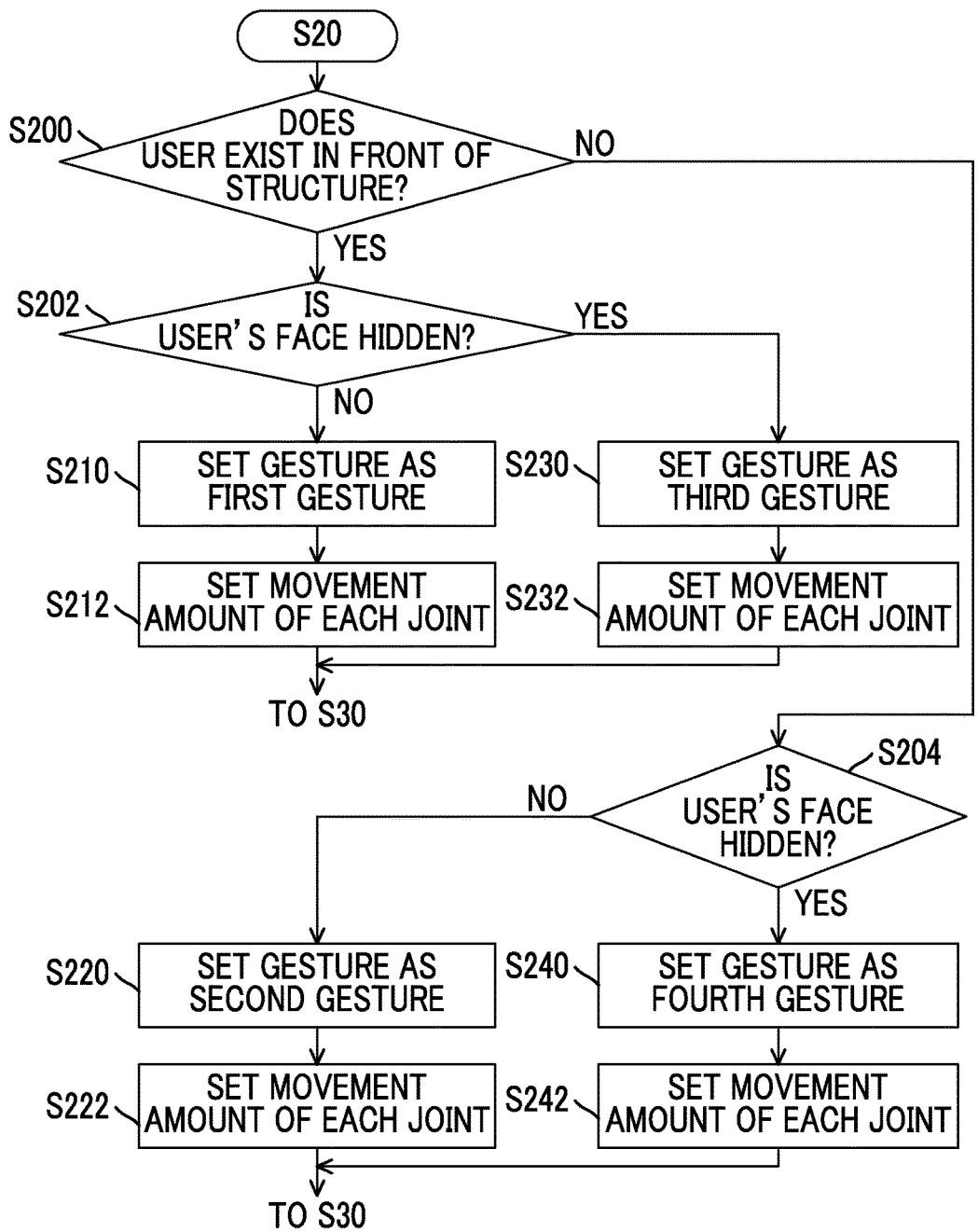
FIG. 11 is a diagram showing a method of setting gesture contents according to a second embodiment.

FIG. 11 is a diagram showing the setting method of gesture contents (S20) according to the second embodiment. The same reference numeral is given to substantially the same processing as that shown in FIG. 6, and the description thereof will be omitted as appropriate.

The gesture contents setting unit 118 determines whether the user exists in front of the structure 2 (step S200). If it is determined that the user exists in front of the structure 2 (YES in S200), the gesture contents setting unit 118 determines whether a part of the user's face is hidden by an obstacle as seen from the face unit 20 of the structure 2 (step S202). For example, if an obstacle exists between the face unit 20 of the structure 2 and the user, the user's face may be hidden by the obstacle as seen from the face unit 20 of the structure 2.

More specifically, the gesture contents setting unit 118 analyzes the image data, captured by the camera 32, and performs face recognition to recognize the user's face. If at least a part of the outline of the user's face is invisible in the image data or if the outline of the user's face is invisible at a predetermined ratio or higher, the gesture contents setting unit 118 determines that the user's face is hidden by an obstacle. The user's face invisibility ratio at which it is determined that the user's face is hidden by an obstacle can be appropriately determined according to the movement of a unit related to the expression content (communication behavior).

If it is determined that the user's face is not hidden by an obstacle (NO in S202), the gesture contents setting unit 118 sets the gesture, which is to be performed by the structure 2, as the first gesture (step S210). After that, the movement amount setting unit 120 sets the movement amount of each joint required to cause the structure 2 to perform the first gesture (step S212).

On the other hand, if it is determined that the user's face is hidden by an obstacle (YES in S202), the gesture contents setting unit 118 sets the gesture, which is to be performed by the structure 2, as a third gesture that is different from the first gesture (step S230). The third gesture will be described later. After that, the movement amount setting unit 120 sets the movement amount of each joint required to cause the structure 2 to perform the third gesture (step S232). The method of setting the movement amount of each joint can be implemented by the above-described method.

On the other hand, if it is determined that the user does not exist in front of the structure 2 (NO in S200), the gesture contents setting unit 118 determines whether a part of the user's face is hidden by an obstacle as seen from the face unit 20 of the structure 2 (step S204). This determination method may substantially be the same as the method of the processing in S202. If it is determined that the user's face is not hidden by an obstacle (NO in S204), the gesture contents setting unit 118 sets the gesture, which is to be performed by the structure 2, as the second gesture (step S220). After that, the movement amount setting unit 120 sets the movement amount of each joint required to cause the structure 2 to perform the second gesture (step S 222).

On the other hand, if it is determined that the user's face is hidden by an obstacle (YES in S204), the gesture contents setting unit 118 sets the gesture, which is to be performed by the structure 2, as a fourth gesture that is different from the first gesture and the second gesture (step S240). The fourth gesture will be described later. After that, the movement amount setting unit 120 sets the movement amount of each joint required to cause the structure 2 to perform the fourth gesture (step S242). The method of setting the movement amount of each joint can be implemented by the above-described method.

The third gesture and the fourth gesture described above are a gesture that expresses a set communication behavior (expression content) while reducing the possibility that the user cannot visually recognize the set communication behavior due to the obstacle. In other words, the third gesture and the fourth gesture are a gesture that is performed while avoiding an obstacle. The term "avoid an obstacle" in the third gesture and the fourth gesture means an operation that is performed, not to prevent a unit of the structure 2 from "contacting" the obstacle, but to reduce the possibility that the user cannot visually recognize a gesture due to the obstacle. Therefore, even if an obstacle is far from the structure 2, the third gesture and the fourth gesture may be performed if the obstacle exists between the face unit 20 of the structure 2 and the user.

The third gesture is a gesture performed by changing the movement of the first gesture so as to reduce the possibility that the user cannot recognize the gesture due to an obstacle. The fourth gesture is a gesture performed by changing the movement of the second gesture so as to reduce the possibility that the user cannot recognize the gesture due to an obstacle. That is, the fourth gesture is more conspicuous than the first gesture and is performed in such a way that the gesture avoids an obstacle. It should be noted that the third gesture and the fourth gesture do not express a behavior completely different from that in the first gesture. The third gesture and the fourth gesture also express the communication behavior basically the same as that expressed by the first gesture.

In the third gesture and the fourth gesture, each joint is moved to avoid an obstacle, for example, according to a method including, but not limited to, the method described below. The controller 100 analyzes the image data and, then, moves each joint so as to tilt the structure 2 to the side opposite to the side on which the user's face is hidden. For example, if it is determined that that a part of the left half of user's face is hidden by an obstacle in the image data (as viewed from the structure 2), the controller 100 moves the body joint unit 16 so that the body unit 6 tilts to the right side. On the other hand, if it is determined that a part of the right half of the user's face is hidden by an obstacle in the image data (as viewed from the structure 2), the controller 100 moves the body joint unit 16 so that the body unit 6 tilts to the left side. In addition, in the third gesture, the controller 100 causes each joint to move so as to express the first gesture while avoiding an obstacle. Similarly, in the fourth gesture, the controller 100 causes each joint to move so as to express the second gesture while avoiding an obstacle. It is also possible to avoid an obstacle by moving the neck joint unit 14 and the arm joint unit 18 according to the position of the obstacle and the set communication behavior.

The movement amount of each joint required to avoid an obstacle may be constant irrespective of the ratio of the hidden part of the user's face. In this case, the controller 100 (the gesture contents setting unit 118) sets a gesture according to the side on which a part of the user's face is hidden. Conversely, the movement amount of each joint required to avoid an obstacle may be determined based on the ratio of the hidden part of the user's face. In this case, the controller 100 (the movement amount setting unit 120) may increase the movement amount of each joint, such as the body joint unit 16, as the ratio of the hidden part of the user's face increases. Thus, the movement amount of the third gesture and the fourth gesture do not need to be constant, but may vary depending on the positional relationship between the user and an obstacle.

Figure 12:
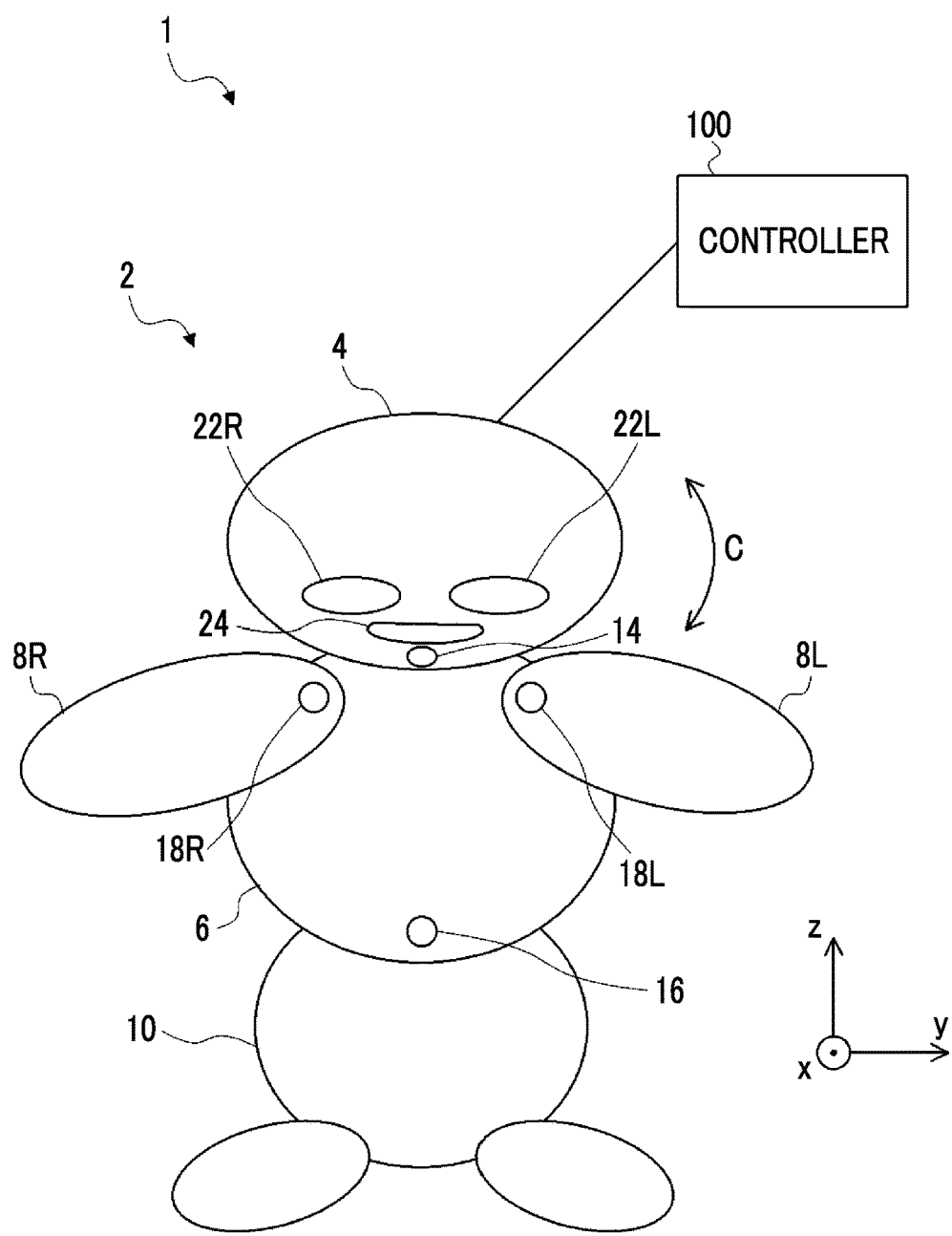
FIG. 12 is a diagram showing a specific example of a first gesture according to the second embodiment.

Next, a specific example of gesture contents according to the second embodiment will be described. In the specific example shown below, the communication behavior is "shaking the head (head unit 4) up and down". FIG. 12 is a diagram showing a specific example of the first gesture according to the second embodiment. As described above, the first gesture illustrated in FIG. 12 is the basic gesture of the communication behavior "shaking the head up and down".

As illustrated in FIG. 12, the controller 100 controls the structure 2 so that the neck joint unit 14 rotates around the rotation axis parallel to the y-axis. This rotation causes the head unit 4 to swing up and down about the neck joint unit 14 as indicated by the arrow C. In this way, the first gesture is expressed. Therefore, it appears to the user that the structure 2 is shaking the head up and down (nodding).

Figure 13:
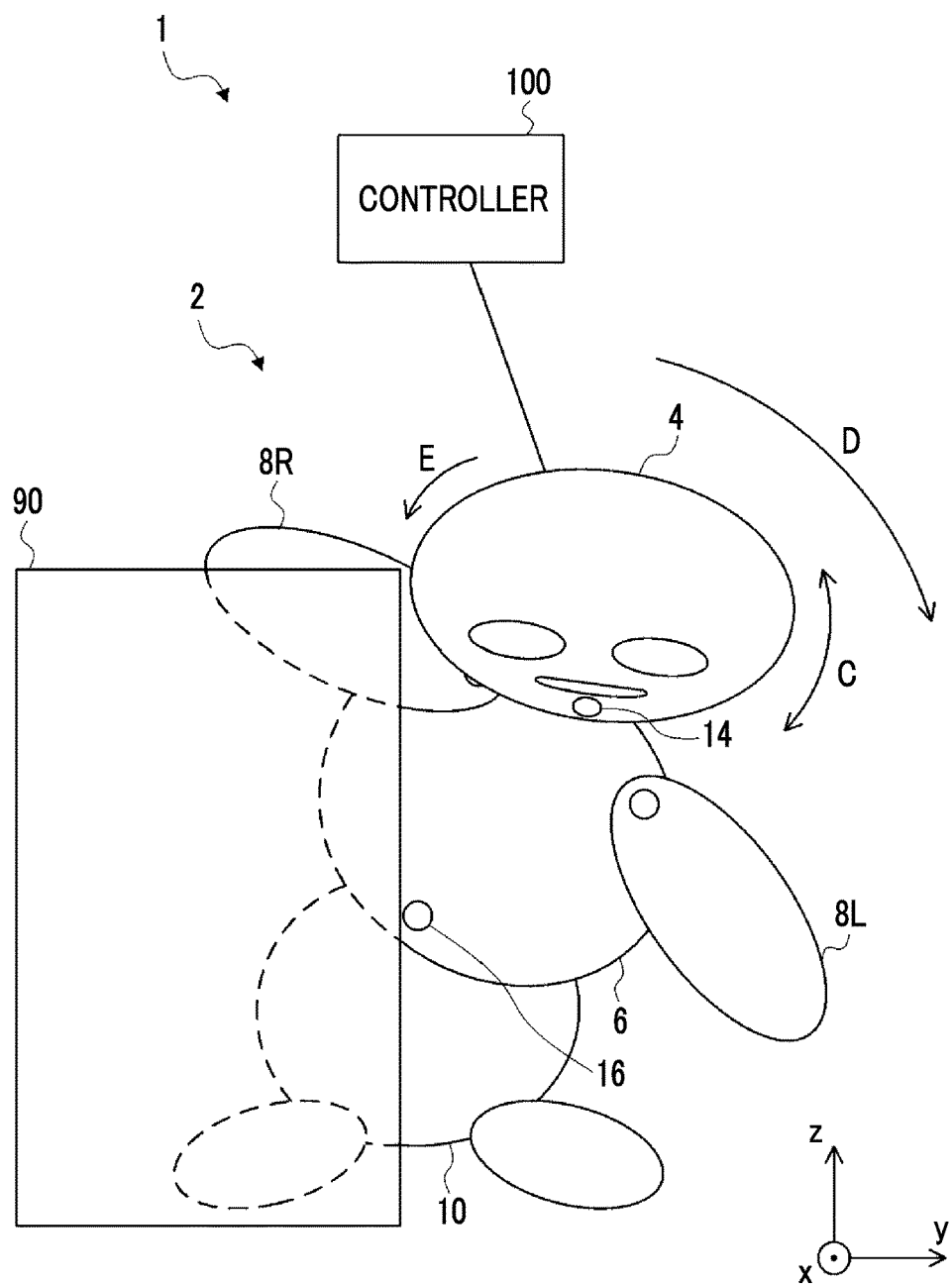
FIG. 13 is a diagram showing one specific example of a third gesture according to the second embodiment.

FIG. 13 is a diagram showing one specific example of the third gesture according to the second embodiment. In the example shown in FIG. 13, there is an obstacle 90 between the structure 2 and the user. In the example shown in FIG. 13, the obstacle 90 is located on the left half side of the structure 2 as seen from the user. Therefore, in the image data, the right half side of the user's face is hidden by the obstacle (as seen from the structure 2).

In this case, the controller 100 rotates the body joint unit 16 slightly in the left direction (clockwise in FIG. 13) around the rotation axis parallel to the x-axis. As a result, the body unit 6 tilts to the left side (to the side of the arm unit 8 L) about the body joint unit 16 as indicated by the arrow D. This allows the user to easily notice the head unit 4 that expresses the communication behavior "shaking the head up and down". Therefore, the user can visually recognize the communication behavior "shaking the head up and down" without being blocked by the obstacle. The controller 100 then controls the neck joint unit 14 so that the head unit 4 swings up and down about the neck joint unit 14, as indicated by the arrow C. At this time, the controller 100 may rotate the neck joint unit 14 in the right direction (counterclockwise in FIG. 13) around the rotation axis parallel to the x-axis, as shown by the arrow E, to prevent the head unit 4 from tilting as the body unit 6 tilts.

As described above, the communication device 1 according to the second embodiment is configured to change the gesture contents to allow the user to visually recognize a communication behavior even when there is an obstacle between the structure 2 and the user. Therefore, the user can visually recognize a communication behavior even when there is an obstacle between the structure 2 and the user. In addition, the structure 2 can express that it is communicating with the user with an obstacle taken into consideration. This further reduces the possibility of giving an unfriendly impression to the user. Therefore, the communication device 1 according to the second embodiment can perform more natural communication considering an obstacle between the structure 2 and the user.

Modification

The present disclosure is not limited to the above-described embodiments, but may be appropriately changed without departing from the spirit of the present disclosure. For example, though, in the embodiments described above, there is one threshold θth that is a reference for determining whether the user's face is in front of the face unit 20 of the structure 2, the number of thresholds θth is not limited to one. Two or more thresholds θth, if provided, allow the gesture to be changed gradually as the user's face moves away from the face unit 20 of the structure 2. That is, the number of second gestures in each communication behavior is not always one. In other words, the number of second gestures corresponding to one first gesture is not necessarily one.

For example, the threshold θth1 may be 15 degrees and the threshold θth2 may be 90 degrees. At this time, assume that the communication behavior is "waving the hand". In this case, when the angle θ1 between the direction of the face unit 20 and the direction of the user's face viewed from the face unit 20 is 15 degrees or larger, the movement range of the arm unit 8 is made slightly larger than in the first gesture. When the angle θ1 becomes 90 degrees or larger, the movement range of the arm unit 8 may be made even larger. Alternatively, when the angle θ1 becomes 90 degrees or larger, not only one arm unit 8 but also both the arm units 8 may be swung.

Furthermore, the threshold θth need not be used as the reference for changing a gesture. Instead, the movement range of a unit (such as the arm unit 8), which expresses a gesture, may be expressed as a function of the angle θ1. In this case, the movement range of a unit may be increased as the angle θ1 increases. It should be noted that using the threshold θth makes easier the control to cause the structure 2 to perform different gestures.

When the second gesture (or the fourth gesture) is performed, that is, when the user is not in front of the face unit 20 of the structure 2, the gesture may be changed so that the orientation of the face of the body of the structure 2 is changed to the direction in which the user exists. This allows the structure 2 to perform a gesture while facing the direction in which the user exists, thus making it possible to conduct more natural communication considering the position of the user.

The difference between the second gesture and the first gesture is not limited to the difference shown in the example in the above-described embodiments. The difference may be any difference as long as the second gesture is more conspicuous to the user than the first gesture. For example, the moving speed of a unit may be faster in the second gesture than in the first gesture. The moving time of a unit may be longer in the second gesture than in the first gesture.

Although a communication behavior is expressed in the above-described embodiments by moving the head unit 4, the arm unit 8, or the body unit 6, the present disclosure is not limited to this configuration. For example, if the structure 2 has legs and the joints for moving the legs, a gesture may be expressed by moving the legs. In addition, a gesture may be expressed by moving a unit of the face unit 20 (eye unit 22, mouth unit 24, etc.).

Although the face unit 20 has the eye unit 22 and the mouth unit 24 in the embodiments described above, the configuration of the face unit 20 is not limited to this configuration. In general, the face unit 20 is required only to have at least a unit that can be recognized as the "face" of a human being. For example, the face unit 20 is required only to have at least the eye unit 22. In addition, the positions of the camera 32, microphone 34, speaker 36 and distance sensor 40 are not limited to the positions on the structure 2 according to the above-described embodiments. In addition, the number of cameras 32, microphones 34, speakers 36 or distance sensors 40 is not limited to the number of those units in the communication device 1 according to the above-described embodiments.

Although the angle θ1 is detected using the image data captured by the camera 32 in the above-described embodiments, the present disclosure is not limited to this configuration. An arbitrary method may be used as long as the position of the user can be recognized and the direction of the user can be detected. For example, a human sensor may also be used.

Although the structure 2 is a robot (humanoid robot) corresponding to a human in the example in the above-described embodiments, the structure 2 is not limited to this configuration. The structure 2 may correspond, not to a human being, but to other creatures (such as dogs or cats). The structure 2 may also be a thing such as a stuffed toy.

What is claimed is:

1. A communication device that performs a communication behavior for a user, comprising:
   a structure that includes a plurality of units and has a face unit having at least one unit that includes a face;
   at least one sensor configured to detect a position of an object around the structure, the position being relative to the structure, wherein the at least one sensor is configured to detect a position of a user's face; and
   a controller configured to:
   cause the structure to perform a gesture by controlling a movement of the units, the gesture expressing the communication behavior;
   calculate an angle between a direction in which the face unit faces and a direction of the user's face as viewed from the face unit,
   control the movement of the units such that the structure performs different gestures according to the angle.

2. The communication device according to claim 1 wherein
   the controller is configured to control the movement of the units such that the structure performs a first gesture if the angle is smaller than a predetermined threshold and is configured to control the movement of the units such that the structure performs a second gesture if the angle is equal to or larger than the threshold, the second gesture being different from the first gesture.

3. The communication device according to claim 2 wherein
   a movement range of the units in the second gesture is larger than a movement range of the units in the first gesture.

4. The communication device according to claim 3 wherein
   if an obstacle detected by the at least one sensor interferes with the movement range of the units, the controller is configured to limit the movement of the units so as to prevent the units from contacting the obstacle.

5. The communication device according to claim 2 wherein
   the controller is configured to control the movement of the units such that any of the units not moving in the first gesture moves in the second gesture to make it easier for the user to visually recognize the movement in the second gesture from the position of the user's face.

6. The communication device according to claim 5 wherein
   the structure has an arm unit corresponding to an arm and the controller is configured to control the movement such that only the arm unit moves in the first gesture and that the arm unit and the face unit move in the second gesture.

7. The communication device according to claim 1 wherein
   the controller is configured to control the movement of the units such that the structure performs different gestures depending on whether a part of the user's face detected by the at least one sensor is hidden by an obstacle.

8. The communication device according to claim 7 wherein
the controller is configured to
control the movement of the units such that the structure performs a third gesture if the angle is smaller than a predetermined threshold and the part of the user's face is hidden by the obstacle,
control the movement of the units such that the structure performs a fourth gesture if the angle is equal to or larger than the threshold and the part of the user's face is hidden by the obstacle, and
control the movement of the units so as to reduce a possibility that the part of the user's face will be hidden by the obstacle in the third gesture and the fourth gesture wherein
a movement range of the units in the fourth gesture is larger than a movement range of the units in the third gesture.

9. The communication device according to claim 7 wherein
the controller is configured to analyze image data captured by the at least one sensor for recognizing the user's face and, if the user's face in the image data is invisible at a predetermined ratio or higher, is configured to determine that a part of the user's face is hidden by the obstacle.

* * * * *